Patented June 21, 1949

2,474,022

UNITED STATES PATENT OFFICE 2,474,022

METHOD OF PURIFYING PTEROYL-GLUTAMIC ACID

Coy W. Waller, Pearl River, N. Y., assignor to American Cyanamid Company, New York, N. Y., a corporation of Maine No Drawing. Application October 5, 1946, Serial No. 701,393

9 Claims. (Cl. 260—251)

This invention relates to a process of purifying synthetic L. casei factor.

The successful synthesis of L. casei factor, also known as folic acid, was announced in Science, vol. 103, page 667, May 31, 1946, by the present inventor and a group of co-workers. This synthetic product, which bears the scientific name N- [4- {-[(2 - amino-4-hydroxy-6-pyrimido[4,5-b]pyrazyl) methyl]amino}benzoyl]glutamic acid, which latter has been shortened to pteroylglutamic acid, is identical with, or analogous to, the L. casei factor isolated from natural sources by various workers in the art. The structural formula of pteroylglutamic acid is as follows:

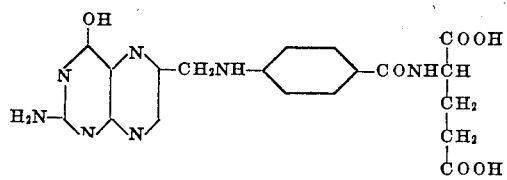

The synthetic product has been found to be an important therapeutic agent in the treatment of macrocytic anemias, sprue, and other related diseases of the blood.

Because of the importance of this new synthetic product in medicine it has become necessary to prepare it in large quantities in a relatively high degree of purity, free from contaminating products which are formed during the synthesis. Although various methods of preparing pteroylglutamic acid have been devised, all of such methods lead to the formation of considerable amounts of biologically inactive by-products which should be removed from the therapeutic substance. Because of the complexity of the pteroylglutamic acid molecule and the methods by which it is synthesized, the product of the reaction contains various position isomers, oxidation products, unreacted intermediates, condensation and/or polymerization products, products of hydrolysis, and various other degradation products. Many of these are closely related to the biologically active pteroylglutamic acid and, as would be expected, possess analogous physical and chemical properties, such as, for example, solubility. It has, therefore, been difficult to separate the useful pteroylglutamic acid from those associated pterins in mixtures resulting from chemical synthesis.

Although methods of purification which are particularly adaptable to the purification of synthetically produced pteroylglutamic acid have been worked out, these methods involve a great many separate manipulations and are not well suited to large scale commercial production. Fortunately, I have discovered a very simple method of purifying synthetically produced pteroylglutamic acid, which may be used in commercial production on a large scale to produce a product having a much higher degree of purity. This new process may be used alone in the separation of pteroylglutamic acid from related pterins or it may be used in conjunction with other processes.

The most important feature of my discovery is based upon the differential solubility of pteroylglutamic acid and other pterins in dilute aqueous solutions of strong acids. In carrying out the process of the present invention the crude synthetic reaction product is dissolved in concentrated strong acids. The solution is clarified by filtration, or otherwise, to remove the insoluble products and is then diluted with water and, surprisingly, folic acid precipitates from the solution in a much higher state of purity. Apparently, most of the biologically inactive pterins remain soluble in the diluted but still moderately concentrated acid.

Hydrochloric acid is the preferred acid of the process although other strong acids, such as hydrobromic, nitric, sulfuric, phosphoric, chlorinated acetic acids, formic, toluenesulfonic, and the like may be used. In carrying out the process the crude pteroylglutamic acid is dissolved in strong acid having a normality of about 2 or higher, preferably above five. As much of the crude product is dissolved in the acid as is possible. Ordinarily it is not necessary to heat the solution, it being an advantage of the process that it can be carried out at room temperature. Stability tests have indicated that the pteroylglutamic acid can be recovered with 90% yield from 12 N hydrochloric acid after six hours at room temperature. After forty-eight hours it was still possible to recover most of the active material. At 50° C. the pteroylglutamic acid can be in contact with 12 N hydrochloric acid for about three hours without serious decomposition. At temperatures as high as 75° C. much decomposition occurred, even when using acids of lower concentration. It is preferred, therefore, that the process be carried out at a temperature from 0° C., or lower, up to not more than about 75° C.

Precipitation of improved pteroylglutamic acid will occur upon mere dilution of the concentrated acid solution. Dilution to within the range 0.5 N to 5 N will give improved pteroylglutamic acid. Dilution to a normality of less than 0.5 will result in the precipitation of some of the impurities along with the pteroylglutamic acid whereas, at the higher concentration of acid, complete precipitation of the active product will not take place. The optimum concentration of acid for complete and rapid precipitation of pteroylglutamic acid is 1 to 2 N at a concentration of 1 part of pteroylglutamic acid for 100 to 200 parts of solution.

A considerable improvement in the process can be made by the use of activated charcoal. This is particularly true when the starting material is of low purity. In using activated charcoal it is added to the concentrated acid and then removed by filtration before the acid solution is diluted. Charcoal should not be used in the weaker acid concentrations since it tends to adsorb pteroylglutamic acid in solutions of low normality. The charcoal appears to adsorb pterins and other bodies which are not separated by the acid treatment and which otherwise might be adsorbed on the precipitated pteroylglutamic acid when the solution is diluted.

To illustrate the invention more clearly reference is made to the following examples.

Example 1

A quantity of crude pteroylglutamic acid containing 1 g. of the active material, the remainder being by-product pterins of the synthesis, was dissolved in 20 cc. of concentrated hydrochloric acid (12 N) at room temperature. The solution was then treated with a few grams of activated charcoal and filtered. The clear solution was then diluted with water to a concentration of 1 N hydrochloric acid. On standing, crystals of pteroylglutamic acid separated from the solution.

Example 2

A crude reaction mixture of 17.5 g. containing 5 g. of real pteroylglutamic acid was mixed with 100 g. of 12 N hydrochloric acid at 32° C. Most of the material dissolved gave a clear brown solution which, however, became slightly turbid after standing 15 minutes. Then, 25 g. of activated charcoal (Norite A) was added and, after 20 minutes, the mixture was filtered. The filter cake was washed, first with 20 cc. of 12 N hydrochloric acid and then with 10 cc. of this strong acid, and the combined filtrate and washings were diluted with 100 cc. of water and cooled to 5° C. for about one hour. The precipitate was collected on the filter, washed with water and acetone, and dried. Chemical assay of the product showed it to contain 82.1% pterolylglutamic acid.

After standing overnight the solution deposited a second crop of crystals which assayed slightly higher in purity.

Example 3

4 g. of a crude reaction product containing 24.8% real pteroylglutamic acid, the remainder being related pterins and some filter aid, was mixed with 20 cc. 12 N hydrochloric acid. One gram of activated charcoal was then added and the slurry filtered. The light yellow filtrate was diluted to 100 cc. with water and cooled. After 16 hours the yellow precipitate which formed was collected, washed with water and acetone, and dried. When analyzed the product was found to be 85.5% pure pteroylglutamic acid.

Example 4

A crude mixture weighing 10.4 g. and containing 1 g. of real pteroylglutamic acid in the form of its zinc salt was slurried in 20 cc. 12 N hydrochloric acid and treated with 1 g. of activated charcoal. The slurry was then filtered and the cake washed with enough water to give a total volume of 100 cc. Pteroylglutamic acid in a much higher state of purity precipitated from the solution on standing.

Example 5

To 40 cc. concentrated hydrochloric acid at room temperature was added 3.91 g. of 39.3% pteroylglutamic acid, 10 g. of activated charcoal and the slurry stirred for ½ hour. After filtering through a sintered glass filter, the filtrate was diluted to 430 cc. After ½ hour at room temperature pterolyglutamic acid commenced to crystallize from solution. The solution was stirred for ¾ hour at 25° C. and then cooled to 10° C. and the solid filtered off, washed with water and acetone. When dried at 60° C. and analyzed it was found to contain 92.2% pteroylglutamic acid and 2.9% water.

Example 6

The process described in the preceding example was repeated using less charcoal, 3 parts by weight for each part of real pteroylglutamic acid. The product obtained was of a slightly higher degree of purity and was recovered with a substantially higher yield.

Example 7

A 5 gram sample of 88% pteroylglutamic acid was dissolved in 50 cc. of 37% hydrochloric acid, treated with 5 grams of activated charcoal and filtered. The charcoal was washed with 100 cc. of the hydrochloric acid and the washings combined with the filtrate which was then diluted to 500 cc. with warm water. On standing at 4 to 6° C., 4.6 grams of crystalline pteroylglutamic acid was deposited. After repeating the crystallization procedure the product was collected, washed with water, alcohol and ether and dried at 140° C. for four hours. Chemical analysis of the product for carbon, hydrogen and nitrogen checked almost perfectly with the theoretical values for $C_{19}H_{19}O_6N_7H_2O$.

Example 8

A 2.78 gram sample of crude material containing 12% of pteroylglutamic acid was dissolved in 15 cc. of 15 N-phosphoric acid. The solution was then treated with 2.78 grams of activated charcoal and filtered. The charcoal was washed with 10 cc. of the phosphoric acid solution, the washings and filtrate were combined and diluted to 100 cc. with water. After standing overnight at 4 to 6° C., pteroylglutamic acid of 50% purity was collected.

Upon twice repeating the treatment described above, the purity of the pteroylglutamic acid is increased to about 92%.

Example 9

A 2.78 gram sample of 12% pteroylglutamic acid was dissolved in a mixture of 20 grams of trichloroacetic acid in 20 grams of water. This solution was treated with one gram of activated charcoal filtrate and diluted to 120 cc. of water. The mixture was warmed until a clear solution was obtained which was then treated with one gram of activated charcoal and filtered. On cooling the filtrate rapidly a tarry material separated which was removed. On standing at 4 to 6° C., crystals of 80% pure pteroylglutamic acid were deposited. A second crop of crystals which were deposited on further standing assayed 90% pure.

Example 10

A 2.78 gram sample of crude material containing 12% pteroylglutamic acid was dissolved in 8 cc. of 18 N-sulfuric acid, treated with one gram of charcoal and filtered. The charcoal was washed with 2 cc. of the 12 N-sulfuric acid, the washings combined with the filtrate which was diluted to 90 cc. and held at 4 to 6° C. overnight. The chilled solution was filtered and the filtrate diluted to 180 cc. with water. After standing at 4 to 6° C. pteroylglutamic acid of 50% purity was deposited.

Example 11

A 5 gram sample of 12% pteroylglutamic acid was dissolved in 20 cc. of 48% hydrobromic acid, treated with 3 grams of charcoal, filtered, treated a second time with 3 grams of charcoal and filtered. The filtrate was diluted to 200 cc. water and allowed to stand overnight at room temperature. The crystalline product which was deposited was collected, washed, dried and assayed. It was found to be pteroylglutamic acid of 88% purity.

Example 12

As previously indicated, considerable improvement in the purity of the product may be obtained without the use of activated charcoal by merely dissolving the pteroylglutamic acid in a strong acid and then diluting the solution. This procedure is particularly applicable when treating pteroylglutamic acid which has already been purified up to 75 to 90%. The crystals of pteroylglutamic acid which precipitated are around 95% pure. In this procedure the pteroylglutamic acid is dissolved in hot water with a minimum of the strong acid to effect solution. On cooling the purified crystals are deposited.

One gram of pteroyl glutamic acid of 88% purity was dissolved in 20 cc. of 20 N-phosphoric acid. The solution was then diluted to 100 cc. with hot water. Crystallization began immediately. After standing at 4 to 6° C. overnight, 0.88 grams of pteroylglutamic acid of improved purity was collected.

The above procedure was repeated using 18 N-sulfuric acid, 70% nitric acid, dichloroacetic acid, 90% formic acid and 75% toluenesulfonic acid. In each case results were substantially the same, pteroylglutamic acid of improved purity being deposited.

I claim:

1. A method of separating pteroylglutamic acid from related pterins which comprises the steps of dissolving pteroylglutamic acid in an aqueous solution of a strong acid having a normality of at least about 2 N and thereafter diluting the solution with water whereupon pteroylglutamic acid is precipitated and recovering the precipitated pteroylglutamic acid.

2. A method of separating pteroylglutamic acid from related pterins which comprises the steps of dissolving pteroylglutamic acid in an aqueous solution of a strong acid having a normality of at least about 2 N and thereafter diluting the solution with water to a lower normality within the range of from about 0.5 to 5.0 whereupon pteroylglutamic acid is precipitated and recovering the precipitated pteroylglutamic acid.

3. A method of separating pteroylglutamic acid from related pterins which comprises the steps of dissolving pteroylglutamic acid in an aqueous solution of a strong acid having a normality of at least about 2 N and thereafter diluting the solution with water to a lower normality within the range of from about 1 to 2 N whereupon pteroylglutamic acid is precipitated and thereafter recovering said pteroylglutamic acid.

4. A method of separating pteroylglutamic acid from related pterins which comprises the steps of dissolving pteroylglutamic acid in an aqueous solution of hydrochloric acid having a normality of at least about five and thereafter diluting the solution with water whereupon pteroylglutamic acid is precipitated and recovering the precipitated pteroylglutamic acid.

5. A method of separating pteroylglutamic acid from related pterins which comprises the steps of dissolving impure pterolyglutamic acid in an aqueous solution of a strong acid having a normality of at least 5, adding activated charcoal to the solution, removing the insoluble matter and thereafter diluting the solution with water to a lower normality within the range 0.5 to 5.0 whereupon pteroylglutamic acid is precipitated and recovering the precipitated pteroylglutamic acid.

6. A method of separating pteroylglutamic acid from related pterins which comprises the steps of dissolving impure pteroylglutamic acid in an aqueous solution of hydrochloric acid having a normality of at least 5, adding activated charcoal to the soution, removing the insoluble matter and thereafter diluting the solution with water to a lower normality within the range 0.5 to 5.0 whereupon pteroylglutamic acid is precipitated and recovering the precipitated pteroylglutamic acid.

7. A method of separating pteroylglutamic acid from related pterins which comprises the steps of dissolving impure pteroylglutamic acid in an aqueous solution of hydrobromic acid having a normality of at least 5, adding activated charcoal to the solution, removing the insoluble matter and thereafter diluting the solution with water to a lower normality within the range 0.5 to 5.0 whereupon pteroylglutamic acid is precipitated and recovering the precipitated pteroylglutamic acid.

8. A method of separating pteroylglutamic acid from related pterins which comprises the steps of dissolving impure pteroylglutamic acid in an aqueous solution of trichloracetic acid having a normality of at least 5, adding activated charcoal to the solution, removing the insoluble matter and thereafter diluting the solution with water to a lower normality within the range 0.5 to 5.0 whereupon pteroylglutamic acid is precipitated and recovering the precipitated pteroylglutamic acid.

9. A method of purifying pteroylglutamic acid which comprises the step of diluting a concentrated aqueous solution of pteroylglutamic acid in a strong acid having a normality of at least five until the normality is within the range 0.5 to 5.0 whereupon pteroylglutamic acid of increased purity is precipitated from solution and recovering the precipitated pteroylglutamic acid.

COY W. WALLER.

No references cited.